United States Patent [19]

Stati et al.

[11] 3,829,903

[45] Aug. 20, 1974

[54] METHOD OF INHIBITING BLOOD CLOT ON SILICONE RUBBER MEDICAL DEVICES

[75] Inventors: Wayne H. Stati, Midland; Jack L. Boone, Larkin Twp., Midland County, both of Mich.

[73] Assignee: Dow Corning Corporation, Midland, Mich.

[22] Filed: Mar. 15, 1973

[21] Appl. No.: 341,654

Related U.S. Application Data

[63] Continuation-in-part of Ser. No. 314,210, Dec. 11, 1972, abandoned.

[52] U.S. Cl................. 3/1, 3/DIG. 3, 128/348, 128/DIG. 21, 260/37 SB, 260/37 M, 252/478
[51] Int. Cl. ...... A61f 1/22, A61f 1/24, A61m 25/00
[58] Field of Search............................... 3/1, DIG. 3; 128/348–351, 214 R, 334 R, DIG. 21; 138/118; 252/478; 260/37 M, 37 SB, 46.5 G

[56] References Cited
UNITED STATES PATENTS 3,228,894  1/1966  Jeckel ........................ 128/349 RX
3,416,531  12/1968  Edwards ............................ 128/348
3,697,473  10/1972  Polmanteer et al. ............ 260/37 SB

OTHER PUBLICATIONS

"Evaluation of Two Prostheses For Total Replacement of The Mitral Valve" by F. S. Cross et al., The Journal of Thoracic and Cardiovascular Surgery, Vol. 46, No. 6, Dec. 1963, pages 719–725.

Primary Examiner—Richard A. Gaudet
Assistant Examiner—Ronald L. Frinks
Attorney, Agent, or Firm—Howard W. Hermann; Gordon Needleman

[57] ABSTRACT

Medical devices for prolonged contact with blood are made of silicone rubber having powdered tungsten incorporated therein to inhibit blood clot formation on the device surfaces.

4 Claims, No Drawings

METHOD OF INHIBITING BLOOD CLOT ON SILICONE RUBBER MEDICAL DEVICES

This application is continuation-in-part of application Ser. No. 314,210 filed Dec. 11, 1972 and now abandoned.

BACKGROUND OF INVENTION

The present invention relates to silicone rubber medical devices for use in contact with blood and more particularly to such devices which have been processed to eliminate or inhibit blood clot formation on the surfaces thereof.

The use of silicone rubber or as it is more correctly called, silicone elastomer, for making various types of medical devices such as prosthetic surgical implants and catheters is well established. This material in general is considered to be relatively inert in the mammalian body. It usually does not cause substantial tissue reaction nor is it subject generally to degradation by action of body fluids. One problem which has been noted, however, with silicone rubber and other materials is a tendency for thrombus formation on or at the surface of a device in contact with blood. Any problem of this sort is particularly critical when it occurs in the bloodstream of a living body, and this occurs for example when the material is used for devices such as indwelling intravenous catheters or for prosthetic heart valves.

The terms "thrombus" and "blood clot" as used synonymously herein are meant to include all solid aggregations formed in blood at or on the surface of objects placed in contact with the bloodstream. Stated in what is perhaps an oversimplified manner, the blood platelets as a body reaction mechanism release enzymes which react with fibrinogin, a protein present in blood plasma, to produce fibrin which is deposited as an entanglement of filamentitious material which traps blood cells and additional platelets.

Two general types of "blood clots" have been observed around catheters inserted into the vena cava. One type is a polyp type thrombus which has small area of contact with the catheter and which can extend from the catheter or can act as a bridge between the catheter and the vena cava wall. This type appears to be a true manifestation of the clotting phenomenon. The second type is an encapsulation of a length of the catheter with a fibrinoid-like material. While this type may be more of a foreign body type reaction than what is normally thought of as a blood clot it is also fibrous in nature and presumably is mostly fibrin. Therefore, for purposes of this application it is to be understood that the term "blood clot" as used herein also includes the second type. Both types are obviously detrimental because they partially obstruct the flow of blood. Additionally, there is the possibility of dislodgment and travel to other parts of the body causing alteration of flow in other blood vessels.

One approach to the problem of blood clot formation which has been tried is administration of heparin to the patient. Heparin does act to prevent blood clotting but the effect is not local and risk of hemorrhage is encountered. Similarly, attempts have been made to bond heparin to surfaces of medical devices in contact with blood or to incorporate heparin in the devices so that it will gradually leach out into the bloodstream. These approaches also are not completely satisfactory because of risk of causing excessive bleeding due to inability of blood to clot. Most present devices are therefore, introduced with no thrombus protection.

SUMMARY OF INVENTION

Surprisingly, it has now been discovered that incorporation of tungsten metal in powder form in silicone rubber compositions in amounts as small as 0.5 percent by weight of the total composition inhibits blood clot formation. The silicone rubber aside from the tungsten can be of the identical formulation of that heretofore known for manufacture of medical devices. Tests thus far have shown no deleterious effect of the tungsten in its environment in the bloodstream nor substantial degradation of the properties of the silicone rubber so long as the amount of tungsten incorporated remains below about 33 percent by weight of the total silicone rubber tungsten composition. An added advantage of the tungsten is X-ray opacity making the indwelling device visible to X-rays. The discovery is applicable to any indwelling device which can be formed from silicone rubber and to external devices designed for use in handling blood and parts of such devices which can be made of silicone rubber. Probably the two most obvious applications are indwelling catheters and prosthetic heart valves but it is to be understood that some benefit can be derived in almost any application where a device is either temporarily or permanently implanted.

DESCRIPTION OF PREFERRED EMBODIMENTS

The present invention is applicable to any silicone rubber (silicone elastomer) which can be made in medical quality. "Medical quality" means that formulations must be chosen and manufacture must be carried out in a manner to eliminate incorporation of materials which are likely to have a deleterious effect on the body in which the material is to be implanted. This necessitates, for example, clean raw materials and special care in handling during the manufacturing and packaging steps. The material is, of course, by its nature subject to sterilization by known techniques such as autoclaving or exposure to ethylene oxide.

The silicone elastomer stocks of the present invention can be any conventional elastomer stock based on a polydiorganosiloxane gum which contains methyl radicals and additionally organic radicals selected from the group consisting of vinyl radicals and 3,3,3-trifluoropropyl radicals bonded to the silicone atoms of the polydiorganosiloxane gum used therein. The polydiorganosiloxane gums are well known in the art and can be obtained commercially. Examples of polydiorganosiloxane gums are those polymers, copolymers and mixtures thereof wherein the repeating units are represented by dimethylsiloxane, methylvinylsiloxane and methyl-3,3,3-trifluoropropylsiloxane units. The polydiorganosiloxane gums can contain vinyl radicals up to 2 mol percent of the total number of organic radicals, preferably up to 1 percent; 3,3,3-trifluoropropyl radicals up to 50 mol percent of the total number of organic radicals and the remaining radicals being methyl radicals. Minor amounts of other monovalent hydrocarbon radicals or halogenated hydrocarbon radicals may also be present in the polydiorganosiloxane if their presence does not deleteriously effect the ultimate properties of the silicone elastomer defined herein. The polydiorganosiloxane gums can have an average of 1.98 to 2.002 silicon bonded organic radicals per silicon atom. The terminating units can be triorganosiloxy units or hydroxyl groups. The triorganosiloxy units can be illustrated by trimethylsiloxy, dimethylvinylsiloxy, dimethyl-3,3,3-trifluoropropylsiloxy, methylphenylvinylsiloxy units and the like. The polydiorganosiloxane gums of the present invention are preferably polydimethylsiloxane gums and polydimethylsiloxane gums containing methylvinylsiloxane units and/or vinyl containing terminating triorganosiloxy units.

The silicone elastomer stocks of the present invention can contain any of the conventional reinforcing silica fillers, such as the fumed silica fillers. These reinforcing silica fillers are well known in the art and can be obtained commercially. The reinforcing silica fillers can be untreated, treated or treated in situ. The treated reinforcing silica fillers can be treated by any of the conventional methods described in the prior art, wherein the treating agents include, organosilanes, organosiloxanes and silazanes. The amount of reinforcing silica filler can be from 10 to 100 parts by weight per 100 parts by weight of the polydiorganosiloxane gum, preferably from 20 to 60 parts by weight reinforcing silica filler.

The silicone elastomer stocks can be cured by conventional vulcanizing agents, preferably organic peroxides and platinum catalysts in combination with organosiloxane compounds having silicon bonded hydrogen atoms. Some illustrative examples of organic peroxides include, bis-(2,4-dichlorobenzoyl) peroxide, benzoyl peroxide, dicumyl peroxide, paradichlorobenzoyl peroxide, tertiary butyl perbenzoate, 2,5-bis(tertiarybutylperoxy)-2,5-dimethylhexane and ditertiary butyl peroxide. The organic peroxides can be present in amounts of from 0.1 to 10 parts by weight per 100 parts by weight of the polydiorganosiloxane gum, preferably from 0.4 to 5 parts by weight.

The platinum catalysts are well known in the art and catalyze the addition of silicon-bonded hydrogen atoms to silicon-bonded vinyl radicals. The platinum catalysts are further defined in U.S. Pat. No. 3,697,473 which is hereby incorporated by reference to define the platinum catalysts such as chloroplatinic acid, platinic chloride, platinum on silica gel, olefin-platinum complexes, and the like. The platinum catalysts are used in catalytic amounts of at least 0.1 parts by weight platinum per million parts by weight of composition.

The platinum catalysts are used in combination with organosiloxane compounds having silicon-bonded hydrogen atoms to vulcanize the polydiorganosiloxane gum stocks having vinyl radicals. These organosiloxane compounds can be any of those having an average of three siliconbonded hydrogen atoms per molecule. These organosiloxane compounds are illustrated in U.S. Pat. No. 3,697,473 which is hereby incorporated by reference to illustrate the organosiloxane compounds (2) beginning at column 4, line 70 of said patent. Example of such organosiloxane compounds are $R'_3SiO(HR'SiO)_y(R'_2SiO)_wSiR'_3$, $HR'_2SiO(R'HSiO)_y(R'_2SiO)_wSiR'_2H$, $R'Si[(OSiR_2)_wOSiR'_2H]_3$ wherein $R'$ is an alkyl radical having from 1 to 12 carbon atoms, phenyl or 3,3,3-trifluoropropyl radicals, $y$ is 3 to 10 and $w$ is 0 to 40. The amount of the organosiloxane compound containing the silicon-bonded hydrogen atom is preferably at least that of organosiloxane compound necessary to provide equal amounts of silicon-bonded hydrogen atoms for the vinyl radical of the polydiorganosiloxane gum. Amounts of organosiloxane compound can exceed the amount sufficient to provide equal molar amounts of SiH and vinyl radicals.

The platinum catalyzed silicone elastomer stocks can also contain platinum catalyst inhibitors which are well known in the art, preferably those of the acetylenic compounds defined in U.S. Pat. No. 3,445,420.

The silicone elastomer stocks of the present invention can also contain other conventional additives, such as plasticizers, fillers, processing aids, and the like. Those skilled in the art of silicone rubber wanting to include some of the conventional ingredients other than those specifically stated in the composition should determine the effect on the properties of the ultimate silicone rubber before using any additive as defined herein.

The silicone elastomer stocks of the present invention can be prepared in any conventional manner, such as by milling the ingredients on a rubber mill. The polydiorganosiloxane, reinforcing silica filler and any processing aids or plasticizers are preferably milled together before the other ingredients are added.

The powdered tungsten of the present invention is thoroughly mixed with the other ingredients before forming the ultimate shape of the article. This can be accomplished by any conventional mixing method for silicone rubber. A milling operation is preferred. The particle size of the tungsten powder is apparently not critical insofar as medical effects of the product are concerned. Tungsten powder in particle sizes in the range of up to 50 microns diameter is relatively easy to add to the composition. The amount of metallic tungsten to be added to the composition should be that which will result in at least 0.5 percent by weight of the total cured silicone rubber composition and should not be more than that which will result in about 33 percent by weight of the total composition (cured silicone elastomer including other fillers and tungsten). Exceeding the 33 percent upper limit results in too great a degradation of the physical properties of the final cured product. In calculating the amount of tungsten to be added to the uncured material the effect of any weight loss, due to volatile solvents or the like, during curing of the material must be taken into consideration.

The final product is obtained by conventional silicone rubber forming techniques such as extrusion into tubular or rod shaped form, molding, calendaring, etc. The formed product is then cured by conventional silicone rubber curing processes such as hot air vulcanization with curing cycle dependent upon the particular formulation of the material. Instead of making the entire embodiment of silicone rubber containing tungsten, laminated configurations can be made in which the surface layer or coating is silicone rubber containing tungsten and other deeper layers are of some other material.

Obviously, many variations of the invention will become apparent to those skilled in the art from a reading of the foregoing description. Therefore, it is to be understood that within the scope of the appended claims the invention may be practiced otherwise than as specifically described.

The following examples are illustrative of specific embodiments of the invention in which all proportions mentioned are by weight unless otherwise indicated.

EXAMPLE 1

Three formulations for examination of relative physical properties were made to determine effect of various amounts tungsten in otherwise identical formulations. In each formulation a first composition A consisted of a dimethylvinylsiloxy endblocked polydiorganosiloxane gum having 0.142 mol percent methylvinylsiloxane units with the remainder being substantially dimethylsiloxane units, the gum exhibiting a Williams plasticity of about 0.060 inch.

A base component X was made by mixing together on a rubber mill 100 parts of composition A with about 39 parts fume silica (Cab O Sil MS-75) and about 10 parts of a hydroxy endblocked polydimethylsiloxane fluid having a hydroxyl content of about 4 weight percent and viscosity of about 40 cs. at 25°C. The resulting mixture was heated 2½ hours at 170°– 180°C.

A base component Y was made by mixing together on a rubber mill 100 parts of composition A with about 68 parts fume silica (Cab O Sil MS-75) and about 22.5 parts of the same hydroxy endblocked polydimethylsiloxane fluid used in component X. The resulting mixture was also heated 2½ hours at 170°– 180°C.

Then 50 parts of each of components X and Y were combined with 0.34 parts methyl butynol, 0.64 parts of a chloroplatinic acid catalyst and 1.07 parts of a low molecular weight trimethylsiloxy endblocked methyl hydrogen siloxane-dimethylsiloxane copolymer. The resulting mixture was divided into three sample portions. Sample 1 was used without further addition of material. Sample 2 had 20 parts tungsten powder, to each 100 parts of the sample, of nominally 99.9 percent purity and 2 micron particle size added on a rubber mill. Sample 3 had 30 parts of the same tungsten powder added to each 100 parts of the sample.

The resultant three samples were sheeted, cured in a heated press and subjected to tests for physical properties. The resultant Table I shows comparative results of these tests:

Table I

| Sample No. | 1 | 2 | 3 |
| --- | --- | --- | --- |
| Durometer (Shore A) | 52 | 50 | 48 |
| Tensile Strength (psi) | 1230 | 1120 | 1040 |
| Elongation (%) | 500 | 640 | 760 |
| Tear (die B, lbs/in) | 162 | 225 | 206 |
| Bashore Resilience (%) | 49 | 42 | 37 |
| Modulus (200%) | 465 | 352 | 250 |

Thus the results show some decrease of physical properties in terms of durometer, tensile strength, resilience and modulus in Samples 2 and 3 as opposed to Sample 1 which contained no tungsten. Sample 3 is obviously degraded more than Sample 2. Sample 3 based on total weight of the cured rubber composition had a tungsten filler content of 23.1 percent by weight.

EXAMPLE 2

A pair of base components I and II were blended to make a composition which was formed into tubing and tested in vivo. Base I consisted of 50 parts each of Components X and Y of Example 1 to which were added 1.8 parts of chloroplatinic acid catalyst and 20 parts of tungsten metal powder identical to that used in Example 1. Base II consisted of 50 parts each of components X and Y of Example I to which was added 2.4 parts of the low molecular weight trimethylsiloxy endblocked methyl hydrogen siloxanedimethylsiloxane copolymer of Example I together with 20 parts of the same tungsten powder and 0.12 parts ethynyl cyclohexanol. Bases I and II were mixed 1:1, extruded into tubing of 0.049 inch outside diameter and cured by hot air vulcanization.

Five 25 cm. long samples of the tubing were washed in absolute ethanol, steam sterilized, and surgically implanted in the vena cava of New Zealand White rabbits. Ten days after implantation the samples were removed from the animals and examined. There was no fibrinoid encapsulation observable on any of the samples as opposed to fibrinoid encapsulation found in 5 out of 5 dimethylpolysiloxane rubber samples in which no tungsten was included. Two of the five tungsten filled samples exhibited bridging polyps between the tubing and the vena cava walls. A third animal exhibited polyp thrombi attached only to the tube. Two of the tungsten filled samples showed no thrombi of any kind. This was a surprising observation. The lack of any fibroid encapsulation as well as only a small number of polyp thrombi was completely unexpected. Blood tests were made to determine any possible effect of the tubing on the blood. There were no statistically significant differences (Students' T-test, $p<0.01$) on any rabbit between pre- and post-implantation data for the following measurements: 1) Hematocrit (lack of red blood cells or increase in RBC number), 2) capillary clot time, 3) platelet count, 4) white blood cell count, or 5) total body weight.

EXAMPLE 3

The material of Sample 1 of Example 1 was compounded with various amounts of tungsten prior to molding between Teflon sheets to form rectangular sample sheets about ⅜ inch in width by 0.075 inch thick, and curing. The cured samples were tested in vitro by submerging about ¼ inch of the length of each sample in untreated freshly drawn whole monkey blood in an open dish. The whole blood in the dishes was allowed to coagulate and the samples were withdrawn from the blood after about twenty minutes which allowed the blood to coagulate but did not allow time to exhibit evidence of clot retraction. Observation was made as to whether the coagulated blood adhered to the samples as they were withdrawn from the blood. Observations of eight samples at each tungsten loading are shown in Table II.

Table II

| Compound Designation | Parts Tungsten added to 100 parts | No. of Adherences/ No. of Samples |
| --- | --- | --- |
| A | 0 | 8/8 |
| B | 0.3 | 5/8 |
| C | 1.25 | 0/8 |
| D | 2.5 | 0/8 |
| E | 5 | 1/8 |
| F | 10 | 0/8 |
| G | 20 | 0/8 |

Lack of adhesion to coagulated blood was considered to be evidence that adherent clots would not be formed on the surface of th rubber in vivo. The observations in Table II indicate some improvement at as little as 0.3 parts by weight of tungsten in the composition when compared with the same material without tungsten added. That which is claimed is:

1. The method of inhibiting formation of blood clots on the surface of silicone rubber medical devices comprising before forming and curing the silicone rubber device mixing with the uncured composition of said silicone rubber a quantity of powdered tungsten which will result in amounts of tungsten between 0.5 and 33 percent by weight of the total composition of the device after curing and contacting the device with live blood.

2. A method as defined in claim 1 wherein said device is a catheter.

3. A method as defined in claim 1 wherein said device is a heart valve.

4. A method as defined in claim 1 wherein said silicone rubber is based on a polydimethylsiloxane cured by use of a platinum catalyst.

* * * * *

UNITED STATES PATENT AND TRADEMARK OFFICE
CERTIFICATE OF CORRECTION

PATENT NO. : 3,829,903
DATED : August 20, 1974
INVENTOR(S) : Wayne H. Statt; Jack L. Boone It is certified that error appears in the above-identified patent and that said Letters Patent are hereby corrected as shown below:

The inventor whose name reads "Wayne H. Stati" should read
--Wayne H. Statt--.

Column 6, line 33, the phrase "Teflon sheets" should read
--Teflon® sheets--.

Column 6, line 62, the phrase "th rubber" should read
--the rubber--.

Signed and Sealed this

Eighteenth Day of August 1981

[SEAL]

Attest:

Attesting Officer

GERALD J. MOSSINGHOFF
Commissioner of Patents and Trademarks